Patented July 21, 1925.

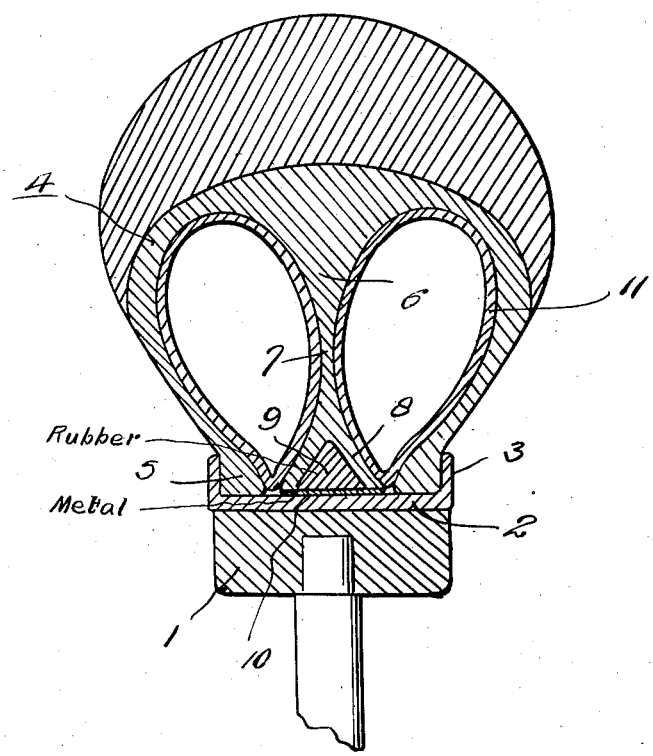

1,546,524

UNITED STATES PATENT OFFICE.

ALFRED WARD, OF VALLEJO, CALIFORNIA.

DUPLEX-TUBE PNEUMATIC TIRE.

Application filed February 7, 1924. Serial No. 691,200.

*To all whom it may concern:*

Be it known that ALFRED WARD, citizen of the United States of America, residing at Vallejo, in the county of Solano and State of California, has invented certain new and useful Improvements in Duplex-Tube Pneumatic Tires, of which the following is a specification.

This invention relates to pneumatic tires in which two inner tubes are used and it consists in the novel features hereinafter described and claimed.

An object of the invention is to provide a duplex tube or twin tube tire structure especially adapted to be used upon the wheels of automobile machines. The tubes are arranged independently of each other in an enclosing casing thereby producing a thicker tread for the tire and the said tubes may be inflated independently of each other and consequently should a puncture occur in one of the tubes, the other tube will remain standing up, thereby permitting the automobile machine to remain under control and enabling the same to proceed to such point or place where repair may be conveniently made.

In the accompanying drawing:

The figure is a transverse sectional view of the duplex inner tube tire structure.

As illustrated in the accompanying drawing, the wheel felly 1 is of usual form and the metallic rim 2 is applied thereto in a usual manner, the said rim being provided at its edges with the usual flanges 3.

The tire structure comprises a casing 4 which is provided at its edges with beads 5 adapted to engage the flanges 3 of the rim 2 in a usual manner. The said casing 4 is further provided and at its inner side with a partition wall 6, the opposite side surfaces 7 of which are concaved as illustrated in the figure of the drawing. The inner edge portion of the partition wall 6 is spread laterally to form flanges 8 which are disposed one at each side of the median radial dimension of the wall 6. A band 9 of rubber is inserted in the inner edge portion of the partition wall 6 to form the flanges 8 and the said band 9 is triangular in transverse section. The band 9 is mounted upon the exterior surface of a continuous metallic band 10 and the said band 10 is applied to the edges of the flanges 8 and retains the band 9 in position between the beads. The inner surface of the band 9 is brought in intimate contact with the intermediate portion of the exterior surface of the rim 2 when the rim is expanded and in condition to be applied to the periphery of the felly 1. In the compartments which are formed at the opposite sides of the partition wall 6 are located pneumatic inner tubes 11 of usual form.

From the foregoing description taken in conjunction with the accompanying drawing, it will be seen that the tire structure is provided in which a plurality of tubes may be employed or used and that the multiplication of the number of tubes increases the tread of the tire structure and such increase will enhance the traction of the tire with the surface of a roadway. The inner tubes may be inflated independently of each other and in the event that one of the tubes should become punctured the other will stand up and thus maintain the general shape of the tire so that the driver of the automobile machine may retain control thereof and the machine may be driven to a point where the necessary repairs may be easily and quickly made and without interfering with the trip of the machine.

Having described the invention, what is claimed is:

A device of the class described including a continuous metallic band, a band of relatively soft material disposed on the exterior surface of the first band and being triangular in transverse section, the edge portions of the first band projecting beyond the side edges of the second band, a tire casing having an intermediate partition wall divided at its inner edge to form flanges, said flanges lying against the side surfaces of the second band and having their edges in contact with the edge portions of the first band, and the casing having beads disposed beyond the edges of the first band.

In testimony whereof I affix my signature.

ALFRED WARD.